US007293557B2

(12) United States Patent
Nakamura et al.

(10) Patent No.: US 7,293,557 B2
(45) Date of Patent: Nov. 13, 2007

(54) ABNORMALITY DETECTING APPARATUS AND ABNORMALITY DETECTING METHOD FOR AN AIR/FUEL RATIO SENSOR

(75) Inventors: Takashi Nakamura, Aichi-ken (JP); Kazunori Kato, Novi, MI (US)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/478,608

(22) Filed: Jul. 3, 2006

(65) Prior Publication Data

US 2007/0006860 A1 Jan. 11, 2007

(30) Foreign Application Priority Data

Jul. 5, 2005 (JP) ............................ 2005-196466

(51) Int. Cl.
*F02D 41/22* (2006.01)
*F02D 41/14* (2006.01)
*G01N 27/409* (2006.01)

(52) U.S. Cl. ....................... 123/688; 73/1.06; 123/690; 204/401; 702/185

(58) Field of Classification Search ................ 123/479, 123/688, 690; 73/1.06, 23.32, 118.1; 701/109; 702/183, 185; 204/401
See application file for complete search history.

(56) References Cited

U.S. PATENT DOCUMENTS 5,781,878 A * 7/1998 Mizoguchi et al. ......... 701/109
6,850,870 B2 * 2/2005 Saga .......................... 702/185
6,912,887 B2 * 7/2005 Ikeda ......................... 73/1.06
2004/0099528 A1 * 5/2004 Hattori ....................... 204/401
2005/0029098 A1 * 2/2005 Aoki et al. ................. 204/406

FOREIGN PATENT DOCUMENTS

JP 2004-125738 A 4/2004

* cited by examiner

*Primary Examiner*—T. M. Argenbright
(74) *Attorney, Agent, or Firm*—Sughrue Mion, PLLC

(57) ABSTRACT

An abnormality detecting apparatus includes an air/fuel ratio sensor that detects an air/fuel ratio within a range including the stoichiometric air/fuel ratio, an admittance detector for detecting an admittance of the sensor, and a temperature detector for detecting a temperature of the sensor. This apparatus detects an abnormality of the sensor when the detected temperature is at a first temperature which is higher than an activation temperature of the sensor and the detected admittance is less than a first determining value. The apparatus also detects a disconnection abnormality of the sensor when the detected temperature is at a second temperature, which is higher than a minimum temperature at which admittance can be detected for a normally operation and lower than the first temperature, and the detected admittance is less than a second determining value for determining disconnection of the sensor which is less than the first determining value.

19 Claims, 5 Drawing Sheets

ABNORMALITY DETECTING APPARATUS AND ABNORMALITY DETECTING METHOD FOR AN AIR/FUEL RATIO SENSOR

INCORPORATION BY REFERENCE

The disclosure of Japanese Patent Application No. 2005-196466 filed on Jul. 5, 2005, including the specification, drawings and abstract is incorporated herein by reference in its entirety.

BACKGROUND OF THE INVENTION

1. Field of the Invention

This invention relates to an abnormality detecting apparatus and an abnormality detecting method for an air/fuel ratio sensor, which is capable of detecting an air/fuel ratio within a wide range that includes the stoichiometric air/fuel ratio.

2. Description of the Related Art

A typical internal combustion engine burns a mixture of air and fuel in a combustion chamber and discharges exhaust gas produced by that combustion to the outside through an exhaust passage. The exhaust passage is provided with an oxygen sensor or an air/fuel ratio sensor to detect the air/fuel ratio of the mixture from the oxygen concentration in the exhaust gas. In the internal combustion engine, feedback control is performed by adjusting the fuel quantity so that the air/fuel ratio detected by this air/fuel ratio sensor becomes a target air/fuel ratio (usually the stoichiometric air/fuel ratio) that is set in advance.

If an abnormality occurs in the air/fuel ratio sensor, however, this type of air/fuel ratio feedback control is no longer able to be appropriately performed, so various measures (such as switching to open loop control) are performed in response to a detected abnormality.

More specifically, abnormality detection for an air/fuel ratio sensor is performed by detecting the temperature of the sensor and the reciprocal of the sensor's resistance value, i.e., the admittance indicative of the ease with which current flows, and comparing that with a determining value.

As shown in the routine illustrated in the flowchart in FIG. 6, the abnormality detecting apparatus for this air/fuel ratio sensor detects the admittance of the sensor when a period of time T has passed after startup of the internal combustion engine (steps S210, S220, and S230). This period of time T is the time required to ensure output from the air/fuel ratio sensor after the engine is started, and is longer than a period of time SA required for the air/fuel ratio sensor to be heated to an activation temperature by a heater. This period of time T is obtained by testing or the like beforehand.

Next, an abnormality in the air/fuel ratio sensor is detected by comparing the detected admittance with a determining value YJ (step S240). Here, there is a tendency for the admittance at the same temperature to drop when there is a decline in performance of the air/fuel ratio sensor due to, for example, deterioration over time. Therefore, as shown in FIG. 7, a decline in performance of the sensor can be detected when the detected admittance is less than the determining value YJ.

When an abnormality is detected (i.e., YES in step S240), a warning lamp indicating an abnormality in the sensor is illuminated and the control system of the fuel quantity is switched to abnormality response control (steps S250 and S260).

When a disconnection abnormality has occurred in the air/fuel ratio sensor, current stops flowing to the sensor so the admittance of the sensor becomes "0". Thus, in both the case in which there is a decline in performance of the sensor as well as the case in which there is a disconnection abnormality in the sensor, the admittance of the sensor becomes lower than the determining value YJ. Therefore, the abnormality detecting apparatus for the air/fuel ratio sensor detects these abnormalities by comparing the admittance with the determining value.

However, while it is necessary to determine the output's precision after the temperature of the sensor reaches the activation temperature in order to detect a decline in performance of the air/fuel ratio sensor, it is not always necessary to make that determination in order to detect a disconnection abnormality. Notwithstanding, the abnormality detecting apparatus for the air/fuel ratio sensor is unable to detect a disconnection abnormality until the temperature of the sensor reaches the activation temperature. As a result, a disconnection abnormality cannot be detected early on, so that measures in response to that abnormality cannot be taken at an early stage.

SUMMARY OF THE INVENTION

In view of the foregoing problems, it is one object of the invention to provide an abnormality detecting apparatus and an abnormality detecting method for an air/fuel ratio sensor, which is capable of detecting a disconnection abnormality early on, and before the temperature of the sensor reaches the activation temperature.

Hereinafter, means for achieving the foregoing object, as well as the operational effects thereof, will be described.

According to one embodiment, an abnormality detecting apparatus for an air/fuel ratio sensor is provided with an air/fuel ratio sensor that detects an air/fuel ratio within a wide range that includes the stoichiometric air/fuel ratio. The apparatus includes an admittance detecting unit for detecting an admittance of the sensor, and temperature detecting unit for detecting a temperature of the sensor. The apparatus detects an abnormality of the sensor when the admittance of the sensor is at a first temperature which is higher than an activation temperature of the sensor but the detected admittance is less than a first determining value. The apparatus further includes a disconnection abnormality detecting unit for detecting a disconnection abnormality of the sensor when the temperature of the sensor reaches a second temperature which is higher than a minimum temperature at which admittance of a normally operating sensor can be detected and lower than the first temperature, and the detected admittance is less than a second determining value for determining disconnection of the sensor.

According to this embodiment, even if the temperature of the air/fuel ratio sensor is higher than the activation temperature of the sensor but lower than the first temperature, a disconnection abnormality of the air/fuel ratio sensor can be detected at the second temperature which is higher than the minimum temperature at which admittance can be detected when the sensor is operating normally but lower than the first temperature. As a result, measures such as switching from feedback control to open loop control can be taken early on when a disconnection abnormality of the air/fuel ratio sensor is detected.

The second temperature in the abnormality detecting apparatus for an air/fuel ratio sensor may equal a temperature near the minimum temperature at which admittance can be detected during normal operation. Thus, a disconnection abnormality of the sensor can be detected even earlier because it can be detected at a temperature near the minimum temperature at which admittance can be detected when the air/fuel ratio sensor is operating normally.

In addition, it is possible to suppress a deterioration of exhaust gas emissions early on because the control of the internal combustion engine can be switched to the abnormality response control when a disconnection abnormality of the air/fuel ratio sensor is detected.

DETAILED DESCRIPTION OF THE PREFERRED EMBODIMENTS

An exemplary embodiment will now be described with reference to FIGS. 1 to 4.

Figure 1:
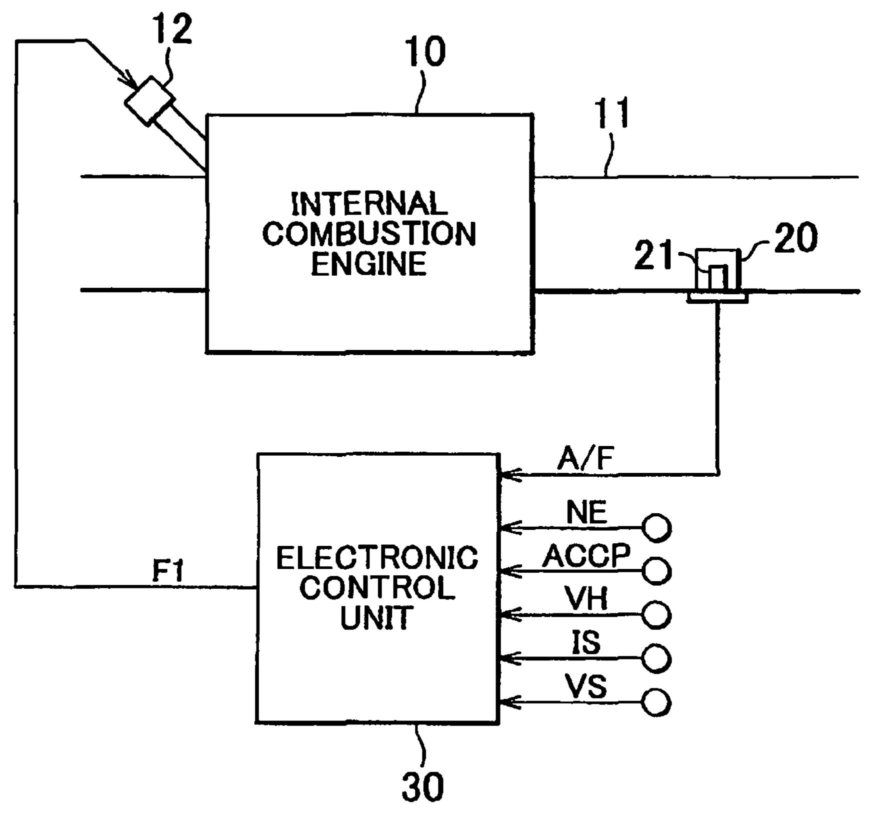
FIG. 1 is a block diagram showing the structure of an abnormality detecting apparatus for an air/fuel ratio sensor according to an exemplary embodiment.

FIG. 1 schematically shows the structure of an abnormality detecting apparatus for an air/fuel ratio sensor according to one embodiment, and an internal combustion engine in which that air/fuel ratio sensor is mounted.

The internal combustion engine 10 is provided with an exhaust passage 11, a fuel injection valve 12, an air/fuel ratio sensor 20, an electronic control unit (ECU) 30, as well as various sensors.

As shown in FIG. 1, the air/fuel ratio sensor 20 is mounted in the exhaust passage 11 of the internal combustion engine 10. This air/fuel ratio sensor 20 has a sintered element (not shown) made of zirconia, an electrode (also not shown) made of platinum that is arranged on a portion of inner and outer peripheral surfaces of the element, and a ceramics heater 21 for keeping the temperature of the element constant. The air/fuel ratio sensor 20 has a characteristic in which the amplitude of the output signal (demarcation current value) changes linearly depending on the degree of richness or leanness in the rich and lean regions.

Figure 2:
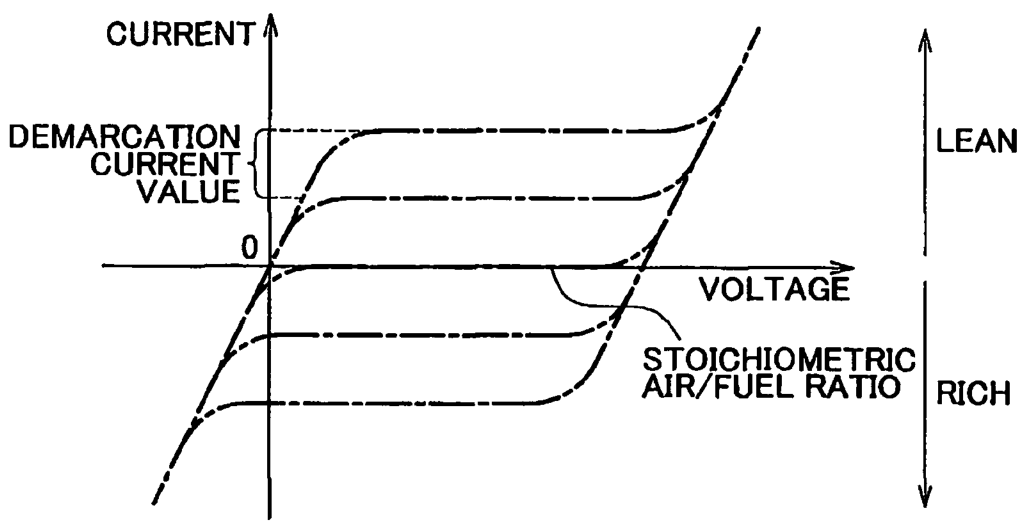
FIG. 2 is a graph showing the relationship between voltage and current of the air/fuel ratio sensor.

FIG. 2 shows this type of voltage-current characteristic of the air/fuel ratio sensor 20. As shown in the drawing, with this voltage-current characteristic, there is a region where the current value does not really change but remains substantially constant even if the applied voltage is changed (hereinafter this current value will be referred to as the "demarcation current value"). When the applied voltage is larger or smaller than the voltage of this region, the current value changes proportionately in response to that applied voltage.

Also, the magnitude of this demarcation current value changes in response to the air/fuel ratio, having a tendency to increase as the air/fuel ratio shifts from rich to lean. The air/fuel ratio can therefore be detected by applying a predetermined voltage to this air/fuel ratio sensor and detecting the magnitude of the demarcation current value of the current that is flowing in the air/fuel ratio sensor at that time.

The ECU 30 comprehensively executes various controls of the internal combustion engine 10 and includes, for example, memory for storing control programs as well as data necessary to execute those programs. The ECU 30 both sets a target air/fuel ratio based on an engine operating state such as an engine speed NE, an accelerator pedal operating amount ACCP and the like, and calculates an air/fuel ratio (i.e., the detected air/fuel ratio) based on an output signal A/F input from the air/fuel ratio sensor 20. The ECU 30 then adjusts the fuel injection quantity by outputting a control signal F1 to the fuel injection valve 12 based on the difference between the detected air/fuel ratio and the target air/fuel ratio. For example, the ECU 30 performs feedback control so that the detected air/fuel ratio is controlled to match the target air/fuel ratio by increasing the fuel injection quantity when the detected air/fuel ratio is leaner than the target air/fuel ratio, and reducing the fuel injection quantity when the detected air/fuel ratio is richer than the target air/fuel ratio (hereinafter this feedback control will be referred to as "air/fuel ratio feedback control").

Also, the ECU 30 detects a declining performance abnormality and a disconnection abnormality of the air/fuel ratio sensor 20 based on a voltage VS applied to the sensor 20, a current IS running through the sensor 20, and a voltage VH applied to the heater. The detection routine for the declining performance abnormality and the disconnection abnormality of this air/fuel ratio sensor 20 will now be described.

Figure 3:
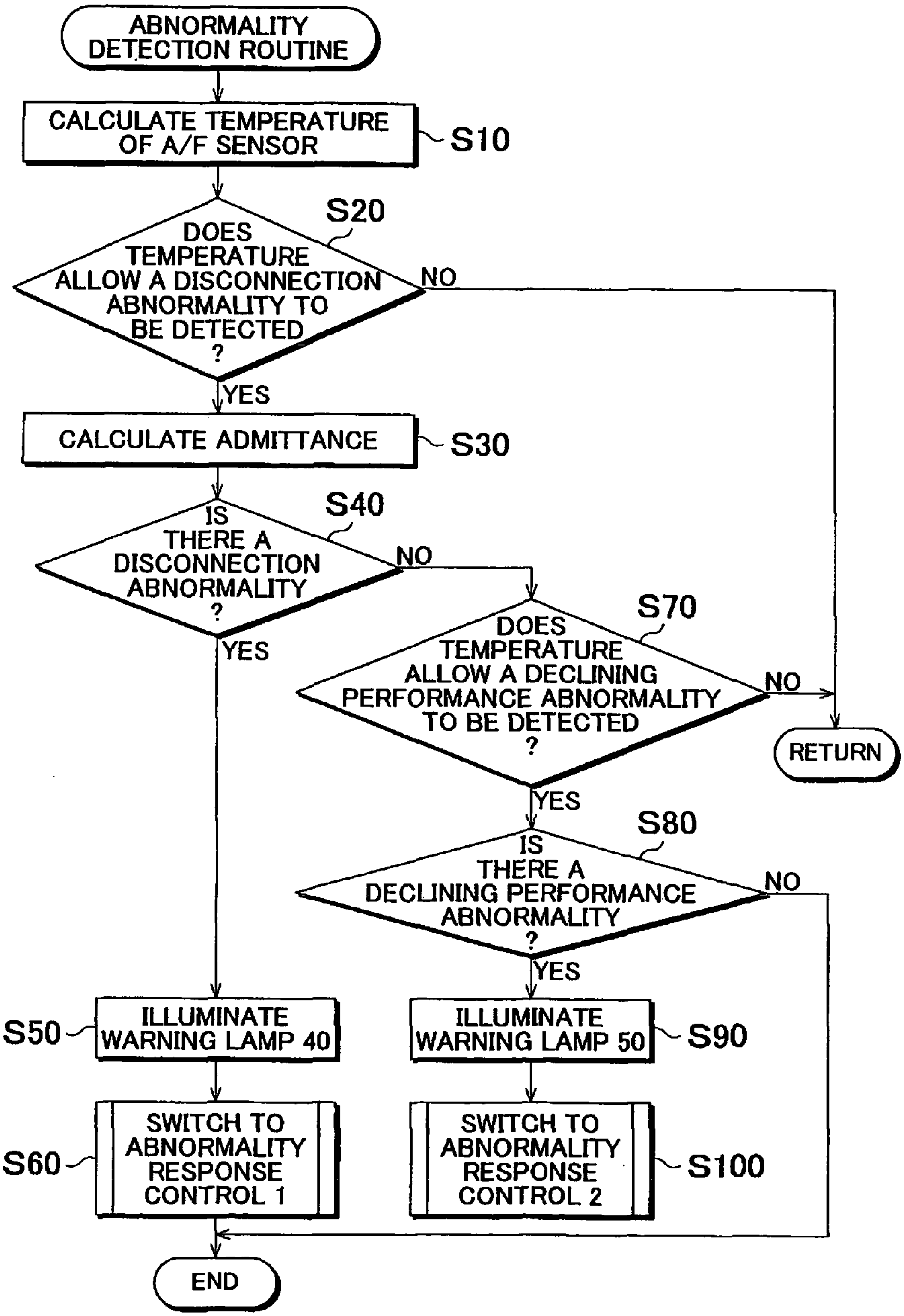
FIG. 3 is a flowchart illustrating a routine for determining an abnormality in the air/fuel ratio sensor according to an embodiment.

FIG. 3 is a flowchart illustrating the routine for this abnormality detection. This routine is actually executed repeatedly at predetermined cycles by the ECU 30.

In the routine shown in FIG. 3, the temperature of the air/fuel ratio sensor 20 is first calculated based on the voltage VH applied to the heater (step S10). This step S10 detects temperature. More specifically, the temperature of the air/fuel ratio sensor is calculated based on an integrated value obtained by adding up the values obtained by multiplying the square values of the voltage VH applied to the heater each second with the duty ratio used in the power application control of the heater. In calculating the temperature of the air/fuel ratio sensor, the square value of the voltage is used as a substitute value for the value of the integrated value of the voltage divided by the resistance value of the heater, i.e., the integrated value of the power input to the heater.

Next, it is determined based on the calculated temperature of the air/fuel ratio sensor whether the temperature of the sensor has reached a temperature at which the disconnection abnormality is able to be detected (i.e., step S20). More specifically, this determination is made by determining whether the temperature of the air/fuel ratio sensor that was calculated in step S10 is higher than a determining temperature THSJ1. The determining temperature THSJ1 is a temperature that is higher than, but near, a minimum temperature TY at which admittance can be detected when the sensor is operating normally (hereinafter this temperature will be referred to as "admittance detectable temperature") and lower than an activation temperature TA of the air/fuel ratio sensor. If the temperature of the air/fuel ratio sensor is higher than the determining temperature THSJ1, it is determined that the temperature of the air/fuel ratio sensor has reached a temperature at which the disconnection abnormality can be detected.

If it is determined in this determination step that the temperature of the air/fuel ratio sensor has reached the temperature at which the disconnection abnormality can be detected (i.e., YES in step S20), then the admittance of the air/fuel ratio sensor is calculated (step S30). More specifically, the impedance, which is the opposition to current flow (i.e., the difficulty with which current flows), is detected based on the voltage VS applied to the air/fuel ratio sensor 20 and the current IS flowing through the sensor 20. The admittance which is the reciprocal value is then calculated from that impedance.

Figure 4:
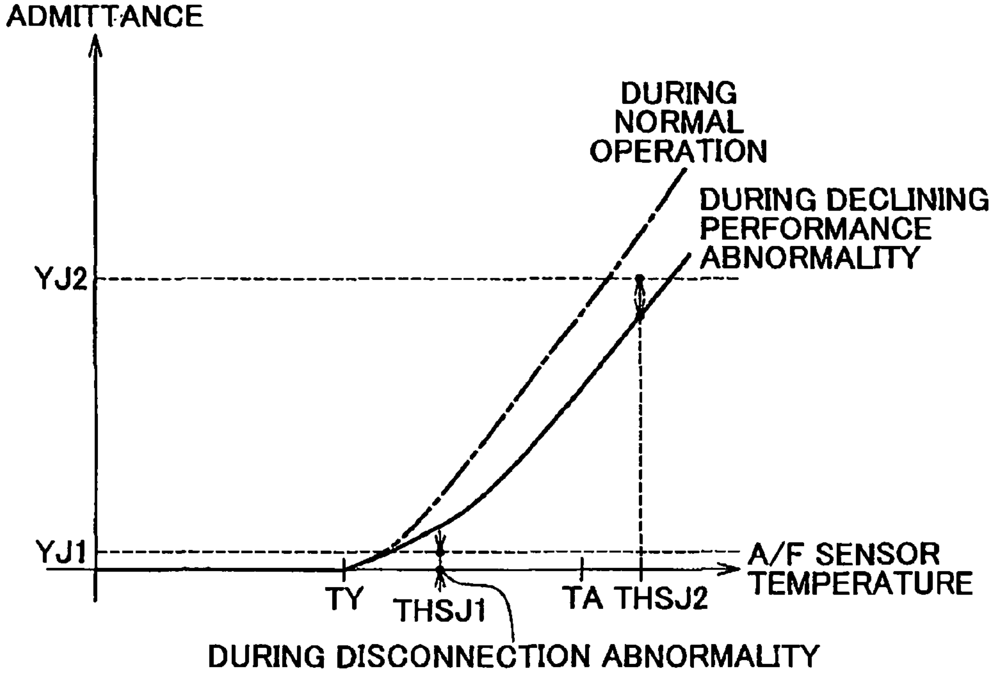
FIG. 4 is a graph showing the relationship between temperature and admittance of the air/fuel ratio sensor.

Next, it is determined whether there is a disconnection abnormality in the air/fuel ratio sensor based on the calculated admittance of the sensor (step S40). More specifically, this determination is made by determining whether the admittance of the air/fuel ratio sensor that was calculated in step S30 is greater than a determining value YJ1. Here, as shown in FIG. 4, when the temperature of the air/fuel ratio sensor is equal to the determining temperature THSJ1, the determining value YJ1 is set to a value that is less than the admittance estimated when there is a declining performance abnormality in the sensor. Setting the determining value YJ1 in this way ensures that a declining performance abnormality will not be erroneously determined as being a disconnection abnormality. Also, when a disconnection abnormality occurs in the air/fuel ratio sensor, the admittance of the sensor becomes approximately "0" so the determining value YJ1 is set larger than "0".

If it is determined that there is a disconnection abnormality in the air/fuel ratio sensor (i.e., YES in step S40), a warning lamp 40 is illuminated (step S50) and the air/fuel ratio feedback control is switched to an abnormality response control 1 (step S60), after which the routine ends. In the abnormality response control 1, open loop control of the air/fuel ratio is performed in order to suppress a deterioration of exhaust gas emissions.

If, on the other hand, it is determined that there is not a disconnection abnormality in the air/fuel ratio sensor (i.e., NO in step S40), then it is determined whether the temperature of the sensor has reached a temperature at which a declining performance abnormality can be detected (step S70). More specifically, this determination is made by determining whether the temperature of the air/fuel ratio sensor that was calculated in step S10 is greater than a determining temperature THSJ2. This determining temperature THSJ2 is set higher than the activation temperature TA of the air/fuel ratio sensor. If the temperature of the air/fuel ratio sensor is higher than the determining temperature THSJ2, then it is determined that the temperature of the air/fuel ratio sensor has reached a temperature at which the declining performance abnormality can be detected.

If through these steps it is determined that the temperature of the air/fuel ratio sensor has reached a temperature at which the declining performance abnormality can be detected (i.e., YES in step S70), then it is determined whether there is a declining performance abnormality in the sensor (step S80). More specifically, this determination is made by determining whether the admittance of the air/fuel ratio sensor that was calculated in step S30 is greater than the determining value YJ2. Here, as shown in FIG. 4, when the temperature of the air/fuel ratio sensor is equal to the determining temperature THSJ2, the determining value YJ2 is set to a value that is less than the admittance estimated when the sensor is operating normally. Setting the determining value YJ2 in this way enables a declining performance abnormality to be detected when the admittance of the air/fuel ratio sensor falls below the determining value YJ2.

If, on the other hand, it is determined that the temperature of the air/fuel ratio sensor has not reached a temperature at which the declining performance abnormality can be detected (i.e., NO in step S70), the routine returns to start.

Further, if it is determined that there is a declining performance abnormality in the air/fuel ratio sensor (i.e., YES in step S80), a warning lamp 50 is illuminated (step S90) and the air/fuel ratio feedback control is switched to an abnormality response control 2 (step S100), after which the routine ends. If, on the other hand, it is determined that there is not a declining performance abnormality in the air/fuel ratio sensor (i.e., NO in step S80), the routine ends.

As described in detail above, the foregoing exemplary embodiment enables the following operational effects to be achieved.

(1) Even if the temperature of the air/fuel ratio sensor 20 is lower than the determining temperature THSJ2, a disconnection abnormality of the air/fuel ratio sensor 20 can still be detected so long as the temperature is higher than the admittance detectable temperature TY. As a result, measures can be taken early on to switch from feedback control to abnormality response control when a disconnection abnormality of the air/fuel ratio sensor 20 is detected.

(2) A disconnection abnormality of the air/fuel ratio sensor 20 can be detected even earlier because it can be detected at a temperature that is near the minimum temperature at which admittance can be detected for a normally operating sensor 20.

(3) It is possible to suppress a deterioration of exhaust gas emissions early on because the control of the internal combustion engine 10 can be switched to the abnormality response control 1 when a disconnection abnormality of the air/fuel ratio sensor 20 is detected.

The foregoing exemplary embodiment may also be implemented with the following modifications.

- In the foregoing exemplary embodiment, the warning lamp 40 is illuminated when it is determined that there is a disconnection abnormality in the air/fuel ratio sensor, and the warning lamp 50 is illuminated when it is determined that there is a declining performance abnormality in the air/fuel ratio sensor. Alternatively, however, the same warning lamp may be used for both abnormalities.
- In the foregoing exemplary embodiment, the air/fuel ratio feedback control is switched to the abnormality response control 1 when it is determined that a disconnection abnormality has occurred in the air/fuel ratio sensor, and switched to the abnormality response control 2 when it is determined that a declining performance abnormality has occurred. Alternatively, however, the same abnormality response control may be used for both abnormalities.
- In the foregoing exemplary embodiment, the temperature of the air/fuel ratio sensor 20 is calculated based on the voltage VH applied to the heater. In addition, however, the outside air temperature and the coolant temperature of the internal combustion engine may be detected by sensors and the calculated temperature of the sensor 20 may be corrected based on these temperatures. Providing a mechanism for calculating temperature of the air/fuel ratio sensor 20 in this way enables the temperature of the air/fuel ratio sensor 20 to be calculated even more accurately.

Figure 5:
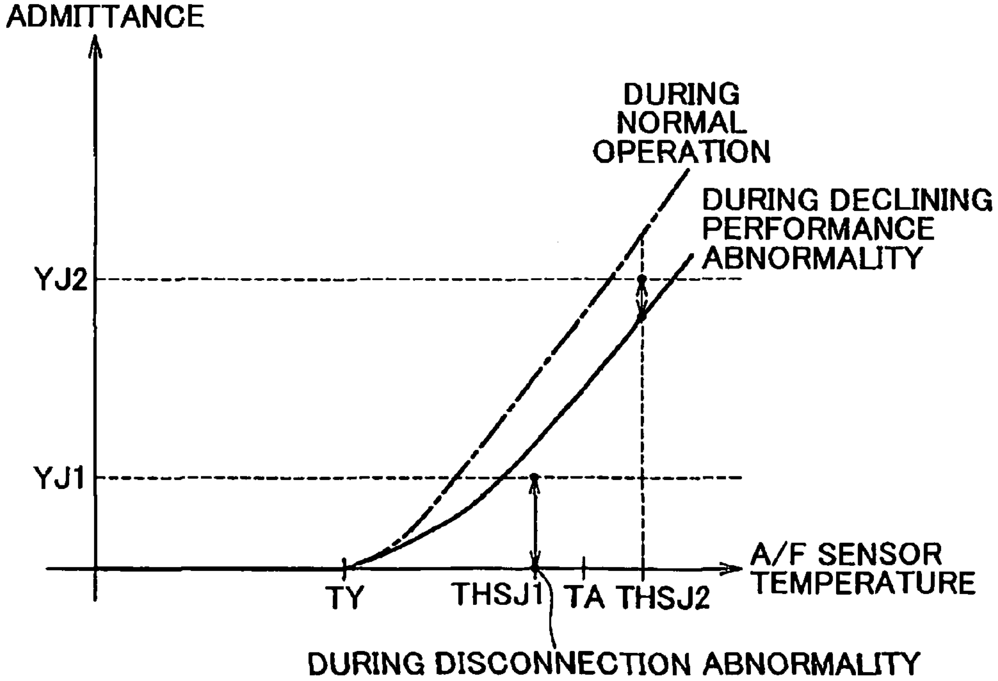
FIG. 5 is a graph showing a modified example of the abnormality detecting apparatus for an air/fuel ratio sensor according to an embodiment.
Figure 6:
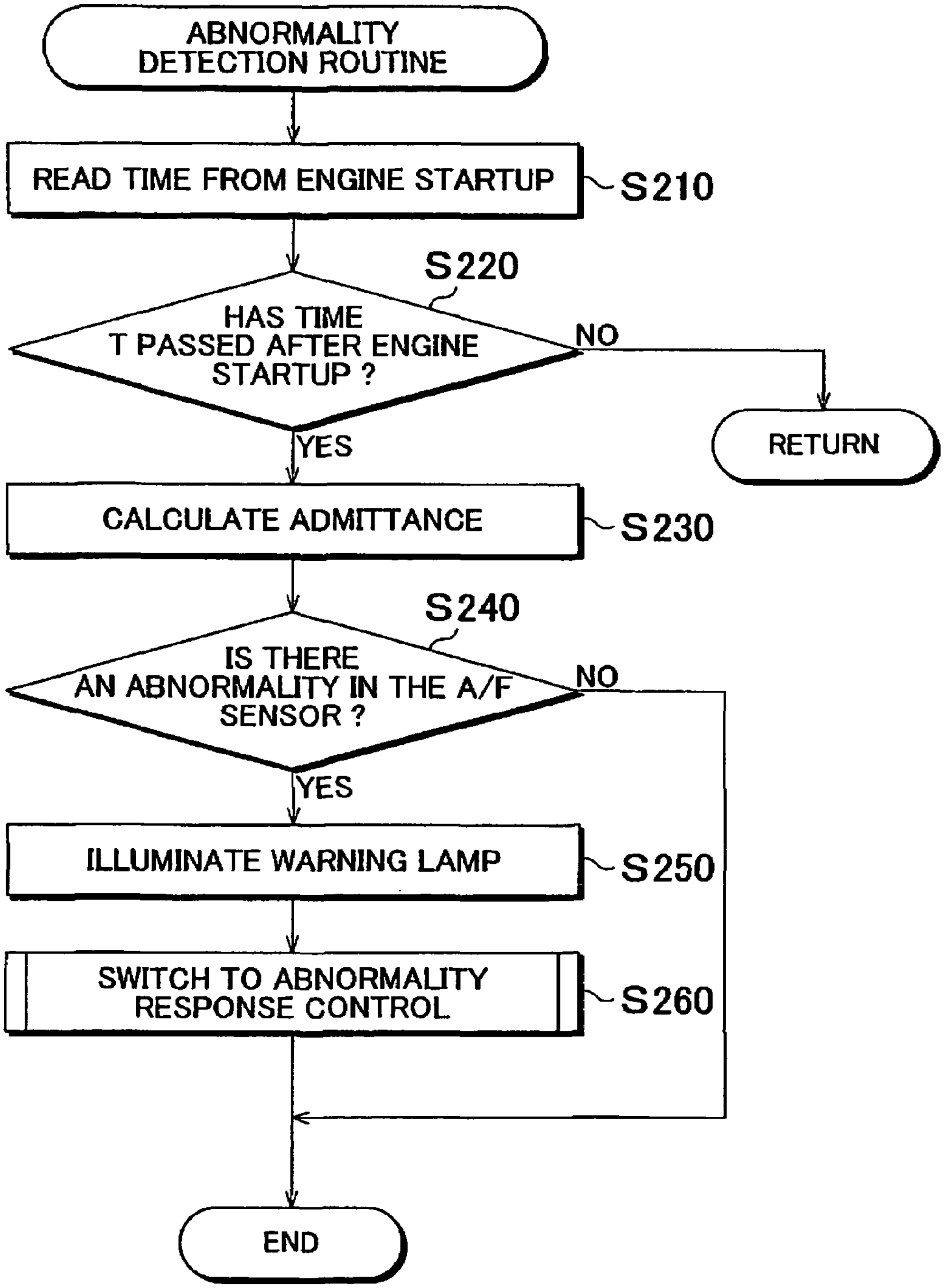
FIG. 6 is a flowchart illustrating a routine for determining an abnormality in a air/fuel ratio sensor according to related art.
Figure 7:
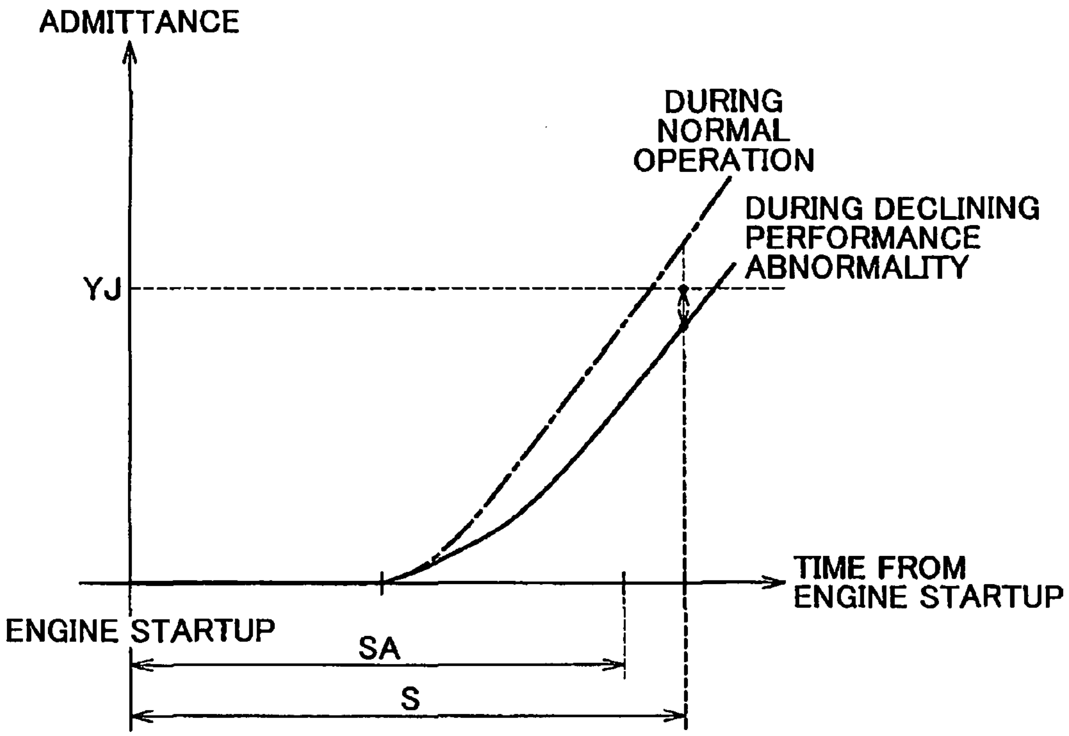
FIG. 7 is a graph showing the relationship between temperature and admittance of the foregoing air/fuel ratio sensor.

In the foregoing exemplary embodiment, the determining temperature THSJ1 is a temperature that is higher than, but near, the admittance detectable temperature TY, but lower than the activation temperature TA of the air/fuel ratio sensor 20. Alternatively, however, the determining temperature THSJ1 may be a temperature that is higher than, but not necessarily near, the admittance detectable temperature TY and lower than the activation temperature TA of the air/fuel ratio sensor 20. FIG. 5 shows a case in which the determining temperature THSJ1 is set to a temperature that is not near the admittance detectable temperature TY. Even when the determining temperature THSJ1 is set in this way, a disconnection abnormality can still be detected before the temperature of the air/fuel ratio sensor reaches the determining temperature THSJ2 at which a declining performance abnormality can be detected.

In the foregoing exemplary embodiment, detection of the disconnection abnormality and the declining performance abnormality is determined based on the admittance of the air/fuel ratio sensor 20. Alternatively, however, this determination may be based on the impedance instead of the admittance. Even in an abnormality detecting apparatus which detects the impedance of the air/fuel ratio sensor and compares that impedance with a determining value in this way, the same operational effects as those displayed by the abnormality detecting apparatus according to the first exemplary embodiment described above are able to be displayed.

What is claimed is:

1. An abnormality detecting apparatus, comprising:

an air/fuel ratio sensor that detects an air/fuel ratio within a range that includes the stoichiometric air/fuel ratio;

an admittance detector that detects an admittance of the sensor;

a temperature detector that detects a temperature of the sensor; and a controller that detects an abnormality of the sensor when the detected temperature of the sensor reaches a first temperature which is higher than an activation temperature of the sensor and the detected admittance is less than a first determining value, wherein the controller detects a disconnection abnormality of the sensor when the detected temperature of the sensor reaches a second temperature which is higher than a minimum temperature at which admittance can be detected when the sensor is operating normally, but is lower than the first temperature, and the detected admittance of the sensor is less than a second determining value for determining disconnection of the sensor.

2. The abnormality detecting apparatus according to claim 1, wherein the second temperature is a temperature near the minimum temperature at which admittance can be detected.

3. The abnormality detecting apparatus according to claim 1, wherein the second determining value is less than the first determining value.

4. The abnormality detecting apparatus according to claim 1, wherein in response to detecting a disconnection abnormality of the sensor, the apparatus issues a warning.

5. An internal combustion engine, comprising:

the abnormality detecting apparatus according to claim 1, and wherein control of the internal combustion engine switches to an abnormal response control when a disconnection abnormality of the sensor is detected.

6. The internal combustion engine apparatus according to claim 5, wherein in response to detecting a disconnection abnormality of the sensor, the apparatus performs an open loop control of the air/fuel ratio.

7. An abnormality detecting apparatus, comprising:

an air/fuel ratio sensor that detects an air/fuel ratio within a range that includes the stoichiometric air/fuel ratio;

an impedance detector that detects an impedance of the sensor;

a temperature detector that detects a temperature of the sensor;

a controller that detects an abnormality of the sensor when the temperature of the sensor reaches a first temperature which is higher than an activation temperature of the sensor, and the detected impedance is less than a first determining value, wherein the controller detects a disconnection abnormality of the sensor when the temperature of the sensor reaches a second temperature which is higher than a minimum temperature at which impedance can be detected when the sensor is operating normally but is lower than the first temperature, and the detected impedance is greater than a second determining value for determining disconnection of the sensor.

8. The abnormality detecting apparatus according to claim 7, wherein the second temperature is a temperature that is near the minimum temperature at which impedance can be detected.

9. The abnormality detecting apparatus according to claim 8, wherein the second determining value is less than the first determining value.

10. The abnormality detecting apparatus according to claim 7, wherein in response to detecting a disconnection abnormality of the sensor a warning is issued.

11. An internal combustion engine, comprising:

the abnormality detecting apparatus according to claim 7, and wherein control of the internal combustion engine switches to an abnormal response control when a disconnection abnormality of the sensor is detected.

12. The internal combustion engine according to claim 11, wherein control switches to an open loop control of the air/fuel ratio when a disconnection abnormality of the sensor is detected.

13. A method of determining an abnormality in an air/fuel ratio sensor, comprising:

detecting a temperature of the air/fuel ratio sensor;

detecting admittance of the air/fuel ratio sensor;

determining a first abnormality in the air/fuel ratio sensor if the detected admittance is less than a first admittance value after the detected temperature of the air/fuel ratio sensor reaches a first temperature value; and determining a second abnormality in the air-fuel ratio sensor if the detected admittance resistance is less than a second admittance value, which is less than the first admittance value after the detected temperature of the air/fuel ratio sensor reaches a second temperature value which is less than the first temperature value.

14. The method according to claim 13, wherein in response to determining one of the first and second abnormality, an open loop control of the air/fuel ratio is performed.

15. The method according to claim 13, wherein in response to determining the second abnormality, a warning is issued.

16. The method according to claim 15, wherein the warning indicates that a disconnection/abnormality has been determined.

17. A method of determining an abnormality in an air/fuel ratio sensor, comprising:

detecting a temperature of the air/fuel ratio sensor;

detecting impedance of the air/fuel ratio sensor;

determining a first abnormality in the air/fuel ratio sensor if the detected impedance is higher than a first impedance value after the detected temperature of the air/fuel ratio sensor reaches a first temperature value; and determining a second abnormality in the air-fuel ratio sensor if the detected impedance is greater than a second impedance value, which is higher than the first impedance value after the detected temperature of the air/fuel ratio sensor reaches a second temperature value which is less than the first temperature value.

18. An abnormality detecting apparatus, comprising:

an air/fuel ratio sensor that detects an air/fuel ratio within a range that includes the stoichiometric air/fuel ratio;

admittance detecting means for detecting an admittance of the sensor;

temperature detecting means for detecting a temperature of the sensor; and control means for detecting an abnormality of the sensor when the detected temperature of the sensor reaches a first temperature which is higher than an activation temperature of the sensor and the detected admittance is less than a first determining value, wherein the control means detects a disconnection abnormality of the sensor when the detected temperature of the sensor reaches a second temperature which is higher than a minimum temperature at which admittance can be detected when the sensor is operating normally, but is lower than the first temperature, and the detected admittance of the sensor is less than a second determining value for determining disconnection of the sensor.

19. An abnormality detecting apparatus, comprising:

an air/fuel ratio sensor that detects an air/fuel ratio within a range that includes the stoichiometric air/fuel ratio;

impedance detecting means for detecting an impedance of the sensor;

temperature detecting means for detecting a temperature of the sensor;

control means for detecting an abnormality of the sensor when the temperature of the sensor reaches a first temperature which is higher than an activation temperature of the sensor, and the detected impedance is less than a first determining value, wherein the control means detects a disconnection abnormality of the sensor when the temperature of the sensor reaches a second temperature which is higher than a minimum temperature at which impedance can be detected when the sensor is operating normally but is lower than the first temperature, and the detected impedance is greater than a second determining value for determining disconnection of the sensor.

* * * * *